United States Patent Office 3,542,779
Patented Nov. 24, 1970

3,542,779
NEW 4-QUINAZOLONE DERIVATIVES AND PROCESS FOR THE PREPARATION THEREOF
Zoltán Ecsery and Ildikó Kósa, Budapest, Hungary, assignors to Chinoin Gyogyszer es Vegyeszeti Termekik Gyara RT., Budapest, Hungary, a firm
No Drawing. Filed Feb. 23, 1968, Ser. No. 707,465
Claims priority, application Hungary, Feb. 28, 1967,
CI–701
Int. Cl. C07d 51/48
U.S. Cl. 260—251                                25 Claims

ABSTRACT OF THE DISCLOSURE

New quinazolone derivatives of the general formula

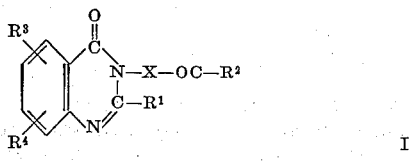

wherein:
$R^1$ stands for hydrogen, alkyl, aryl, aralkyl or a heterocyclic radical;
$R^2$ stands for hydrogen, alkyl, aryl, aralkyl or a heterocyclic radical;
$R^3$ stands for hydrogen, halogen, nitro, amino, hydroxy, alkoxy, aryloxy, alkyl or aryl;
$R^4$ stands for hydrogen, halogen, nitro, amino, hydroxy, alkoxy, aryloxy, alkyl or aryl; and
X stands for a valency bond, oxygen or sulfur.

The compounds are useful acylating agents and possess valuable therapeutical properties, e.g. as antiinflammatory agents.

---

This invention is directed to new heterocyclic compounds and a process for the preparation thereof. More particularly it is concerned with new 4-quinazolone derivatives, a process for the preparation thereof and pharmaceutical compositions containing same.

According to a feature of the present invention there are provided new quinazolone derivatives of the general formula

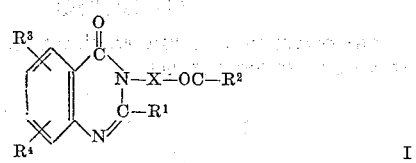

wherein:
$R^1$ stands for hydrogen, alkyl, aryl, aralkyl or a heterocyclic radical;
$R^2$ stands for hydrogen, alkyl, aryl, aralkyl or a heterocyclic radical;
$R^3$ stands for hydrogen, halogen, nitro, amino, hydroxy, alkoxy, aryloxy, alkyl or aryl;
$R^4$ stands for hydrogen, halogen, nitro, amino, hydroxy, alkoxy, aryloxy, alkyl or aryl;
X stands for a valency bond, oxygen or sulfur.

The "alkyl groups" may be straight or branched chained saturated hydrocarbon radicals containing preferably 1–6 carbon atoms, such as methyl, ethyl, n-propyl, isobutyl, etc.

The "aryl radicals" may contain preferably one or two phenyl rings, such as phenyl or naphthyl. Said radicals may be substituted by one or more substituents selected from the group consisting of halogen (e.g., chlorine or bromine), alkyl (e.g., methyl or ethyl), alkoxy (e.g., methoxy or ethoxy), hydroxy, mercapto, nitro, amino or substituted amino.

The "aralkyl radicals" according to the present invention may contain preferably not more than 10 carbon atoms (such as benzyl or phenethyl). Said groups may be optionally substituted by one or more radicals selected from the group consisting of halogen (e.g., chlorine or bromine), alkyl (e.g., methyl or ethyl), alkoxy (e.g., methoxy or ethoxy), hydroxy, mercapto, nitro, amino or substituted amino.

The definition "heterocyclic radical" relates to such radicals containing one or more hetero atoms selected from the group consisting of nitrogen, oxygen and sulfur. The heterocyclic radicals may contain one or more rings. The heterocyclic radicals containing one ring may comprise five or six members. As suitable representatives of the heterocyclic radicals there may be mentioned, e.g., the thiazolyl, furyl, pyridyl, piperidyl, piperazinyl, imidazolyl, pyrazolyl, morpholinyl, benzimidazolyl, oxazolyl, isoxazolyl groups etc. Said radicals may be optionally substituted by one or more substituents selected from the group consisting of halogen (e.g., chlorine or bromine), alkyl (e.g., methyl or ethyl), alkoxy (e.g., methoxy or ethoxy), hydroxy, mercapto, nitro, amino, substituted amino or aryl (e.g., phenyl or substituted phenyl).

The definition "halogen atom" encompasses all the four halogen atoms, i.e., chlorine, bromine, iodine and fluorine. The halogen atom represents, however, preferably a chlorine or bromine atom.

The term "alkoxy group" stands preferably for straight or branched-chain lower alkoxy groups containing 1–6 carbon atoms, such as methoxy, ethoxy, isopropoxy etc.

The "aryloxy groups" contain according to the definition of the present invention aryl groups comprising preferably one or more phenyl rings, such as benzyloxy or naphthyloxy. Said groups may be optionally substituted by one or more substituents hereinbefore disclosed by the definition of the aryl group. As suitable representatives of the compounds of the Formula I there may be mentioned for example the following derivatives:

3-acetyl-7-nitro-4-quinazolone
3-acetyl-6-chloro-4-quinazolone
3-acetyl-4-quinazolone
3-acetyl-6,8-dichloro-4-quinazolone
3-benzoyl-4-quinazolone
3-(p-nitro-benzoyl)-4-quinazolone
3-(p-chloro-benzoyl)-4-quinazolone
3-carbethoxy-4-quinazolone
3-benzoyl-7-nitro-4-quinazolone
3-(p-chloro-benzoyl)-7-nitro-4-quinazolone
3-acetoxy-4-quinazolone
3-benzoxy-4-quinazolone
2-methyl-3-acetoxy-4-quinazolone
2-methyl-3-butyryloxy-4-quinazolone
2-methyl-3-carbethoxy-oxy-4-quinazolone
2-methyl-3-(N-carbobenzyloxy-glycyl-oxy)-4-quinazolone
2-methyl-3-benzoyloxy-4-quinazolone
2-methyl-3-(p-chloro-benzoyl-oxy)-4-quinazolone
2-methyl-3-(3,5-dinitro-benzoyloxy)-4-quinazolone
2-methyl-3-(p-toluyloxy)-4-quinazolone
2-methyl-3-(p-nitro-benzoyloxy)-4-quinazolone
2-methyl-3-(3-phenyl-5-methyl-4-isoxazolyl-carbonyloxy)-4-quinazolone
2-methyl-3-acetoxy-4-quinazolone
2-phenyl-3-benzoyl-oxy-4-quinazolone.

According to a further feature of the present invention there is provided a process for the preparation of the new quinazolone derivatives of the Formula I, which comprises reacting a compound of the general formula

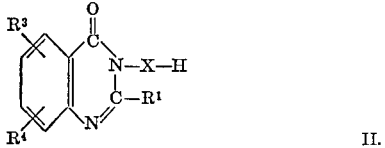

wherein $R^1$, $R^3$, $R^4$ and X have the same meaning as stated above, or a salt thereof formed with an organic or inorganic base with an acid of the general formula

wherein $R^2$ has the same meaning as stated above, or a reactive derivative thereof.

The quinazolone derivatives of the general Formula II may also be used in the form of their salts formed with alkali metals, alkaline earth metals or organic bases. It is preferred to use the salts formed with sodium, potassium, calcium, or tertiary amines (such as triethylamine) or heterocyclic bases (such as pyridine, quinoline). The acids of the Formula III may be used in the form of the free acid or a reactive derivative thereof. As reactive acid derivatives the anhydrides or the halogenides, particularly the chlorides may be used.

According to a form of realization of our process the anhydrides of the acids of the Formula III are reacted with the compounds of the Formula II or salts thereof, whereby the acid formed in the reaction may be optionally removed from the system. The reaction may be carried out preferably by the application of heat. In the case of certain highly reactive derivatives the compound of the Formula I. Thus prepared may react with the acid formed from the anhydride; whereby the acid anhydride and the starting material of the Formula II are obtained. Thus an equilibrium exists between the reactants of the Formulae II and III, which may be illustrated by the following reaction-equation:

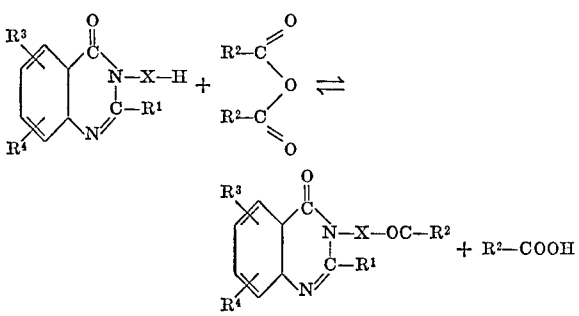

Said equilibrium may be shifted into the direction of the formation of the compound of the Formula I by removing the acid formed from the reaction mixture. Such an equilibrium takes place, e.g., by reacting 4-quinazolone or 6,8-dichloro-4-quinazolone with acetic anhydride. The equilibrium may be shifted into the direction of the formation of the N-acetyl-4-quinazolone derivative by distilling off the acetic acid formed with the aid of xylene. According to another embodiment of the process of the present invention the compounds of the Formula I may be prepared by reacting a salt of a compound of the Formula II formed with an alkali metal, alkaline earth metal, a tertiary base or a heterocyclic base with a halogenide of an acid of the Formula III. The reaction may be carried out preferably in the presence of an inert solvent such as benzene, toluene, xylene, petrol, dimethylformamide, dioxane, tetrahydrofurane, ether or chlorinated hydrocarbons such as chloroform. The reaction may be preferably accomplished at a temperature within the range of $-20°$ C. to $+100°$ C.

The reaction may be carried out preferably in the presence of an acid binding agent, e.g., an organic tertiary base. In this case the organic tertiary base may also act as solvent, but one may also use another solvent or carry out the interaction without solvent. The acid halogenide may be used preferably in an amount of 1 mole calculated on 2 moles of the compound of the Formula II.

According to a further form of realization of our process the compounds of the Formula II are reacted with mixed anhydrides. Said mixed anhydrides may be prepared by reacting the corresponding acid of the Formula III with a chloro-formiate or another acid derivative in the presence of an acid-binding agent (e.g., a tertiary amine). The reaction mixture thus obtained is then reacted with the 4-quinazolone derivative. The reaction may be carried out preferably in an inert solvent but one may also accomplish same without using any solvent.

According to another embodiment of our process the compounds of the Formula II are reacted with the corresponding acid of the Formula III in the presence of a dehydrating agent, such as dicyclohexyl-carbodiimide. The reaction may be carried out preferably in a suitable solvent which does not react with the starting materials and the products formed. As such solvent, e.g., aromatic or aliphatic hydrocarbons (benzene, toluene, xylene, petrol, etc.), dimethylformamide, ether, dioxane, tetrahydrofurane or chlorinated hydrocarbons (chloroform, trichloroethylene, carbon tetrachloride, etc.) may be used. The reaction-temperature may vary between $-20°$ C. and $+100°$ C.

One may also proceed by reacting a compound of the Formula II or a salt thereof formed with an alkali metal or an alkaline earth metal with phosgene in the presence of an acid-binding agent and reacting the urea or carbonate derivatives thus obtained with the corresponding acid of the Formula III to yield the compounds of the Formula I.

The compounds of the Formula I are on the one hand useful acylating agents and possess on the other hand valuable therapeutical properties.

The advantage of the compounds of the Formula I over the conventional acylating agents (e.g., acid chlorides or acid anhydrides) resides in the fact that by the acylation reaction no substances of acidic character are formed therefrom. Moreover the quinazolone derivatives of the Formula I may be prepared in a more simple way than the acid azides also used for acylation and the activity of the compounds of the present invention surpasses that of the p-nitro-phenyl-esters used for acylation in peptide chemistry [Acta Chem. Acad. Sci. Hung. 10. 335, 1957]. Due to the slight solubility of the compounds of the Formula II the starting materials may be more readily recovered than the recently used 1-hydroxy-piperidine-esters and N,N-dialkyl-hydroxylamine-esters (J. Chem. Soc. 1965. 6814) and are more stable than the N-hydroxy-phthalimide-derivatives [Rec. des Traveux Chem. d. Pays Bas 81. 683, 1962].

The activity of the new compounds of the Formula I may vary between wide ranges therefore their field of application is broader than that of the hitherto known acylating agents. Thus the compounds of the Formula I wherein X stands for a valency bond are highly active and are capable for the acylation of compounds having small nucleophyl activity (e.g., secondary or tertiary alcohols) or for the preparation of acid anhydrides.

Compounds of the Formula I wherein X stands for oxygen exhibit smaller activity and acylate the compounds of greater nucleophyl activity (e.g., those containing amino-group) in a selective way.

The starting materials of the general Formula II may be easily prepared either from anthranilic acid (J. Pract. Chem. (2), 51,564 (1895)) or from 3,1,4-benzoxazones (Chem. Ber. 35, 3481-3 (1902)). The acylating agents of different activity may be prepared substantially from identical, readily available starting materials.

The compounds of the present invention possess anti-inflammatory properties.

According to a further feature of the present invention there are provided pharmaceutical compositions containing as active ingredient at least one compound of the general Formula I. Said compositions may contain inert organic or inorganic pharmaceutical carriers, such as water, starch, magnesium-stearate, talc, polyalkylene glycols, etc. The compositions may be present in solid (tablets, pills, capsules, suppositories) or liquid form (such as solutions, emulsions, suspensions, injectable preparations, etc.). The pharmaceutical compositions may optionally contain further additives (e.g., stabilizing, wetting and suspending agents, buffers etc.) and further known therapeutically useful substances.

Further details of our invention are to be found in the examples. It is however by no means intended to limit our invention to the examples.

EXAMPLE 1

(a) Preparation of 3-acetyl-4-quinazolone 5 g. of 4-quinazolone are refluxed with 50 ml. of acetic anhydride for 6 hours. The reaction mixture is evaporated in vacuo whereupon the residue is admixed with benzene. The material insoluble in benzene is filtered, washed with benzene and dried. Thus 4-quinazolone is obtained; M.P.: 208–211° C. The filtrate is evaporated in vacuo and the residue is recrystallized from benzene. The melting point of the 3-acetyl-4-quinazolone amounts to 86–88° C.

Analysis.—Calcd. for $C_{10}H_8N_2O_2$ (percent): C, 63.8; H, 4.25; N, 14.9. Found (percent): C, 63.75; H, 4.4; N, 15.07.

(b) Preparation of 3-acetyl-4-quinozolone by distilling off the acetic acid formed 20 g. of 4-quinazolone are boiled with 200 ml. of acetic anhydride for 2 hours. The reaction mixture is subjected to distillation in vacuo so that a constant reaction volume is provided by subsequent addition of 50 ml. of anhydrous xylene, 50 ml. of acetic anhydride and 50 ml. of anhydrous xylene. This procedure requires 4 hours. The reaction mixture is then evaporated to dryness and the residue being completely soluble in benzene in recrystallized from benzene. Thus crystals melting at 86–88° C. are obtained by quantitative yields. A mixture of the product and the 3-acetyl-4-quinazolone obtained by Example 1(a) does not show a melting-point depression.

EXAMPLE 2

Preparation of 3-acetyl-7-nitro-4-quinazolone 2 g. of 7-nitro-4-quinazolone are boiled with 20 ml. of acetic anhydride as described in Example 1(a).

The reaction mixture is cooled, whereupon the precipitated crystals are filtered, washed with benzene and recrystallized from anhydrous toluene. Thus 3-acetyl-7-nitro-4-quinazolone is obtained, M.P.: 165–167° C.

Analysis.—Calcd. for $C_{10}H_7N_3O_4$ (percent): C, 51.4; H, 3.07; N, 18.0. Found (percent): C, 51.3; H, 3.22; N, 18.2.

EXAMPLE 3

The 3-acetyl-6-chloro-4-quinazolone is prepared according to the method described in Example 1(a) M.P.: 112–113° C.

Analysis.—Calcd. for $C_{10}H_7ClN_2O_2$ (percent): C, 53.95; H, 3.14; N, 12.58; Cl, 15.95. Found (percent): C, 54.10; H, 3.28; N, 12.65; Cl, 16.20.

EXAMPLE 4

The 3-acetyl-6,8-dichloro-4-quinazolone is prepared according to the method described in Example 1(b). M.P.: 160–162° C.

Analysis.—Calcd. for $C_{10}H_7ClN_2O_2$ (percent): C, 46.7; H, 2.37; N, 10.88; Cl, 27.5. Found (percent): C, 46.51; H, 2.56; N, 10.9; Cl, 27.9.

EXAMPLE 5

Preparation of 3-benzoyl-4-quinazolone (a) 2.92 g. of 4-quinazolone and 9.04 g. of benzoic anhydride are heated at 140° C. under reduced pressure (2 mm. Hg) for 6 hours. The benzoic acid sublimates from the reaction mixture. The reaction mixture is recrystallised from benzene. Thus 3-benzoyl-4-quinazolone is obtained. M.P.: 135–136° C.

Analysis.—Calcd. for $C_{15}H_{10}N_2O_2$ (percent): C, 72.0; H, 3.95; N, 11.19. Found (percent): C, 72.11; H, 4.10; N, 11.31.

(b) 4.6 g. of sodium are dissolved in 300 ml. of anhydrous ethanol whereupon 29.2 g. of 4-quinazolone are added and the reaction mixture is boiled for half an hour. The solvent is distilled off in vacuo. The residue is made free of alcohol by addition of anhydrous benzene. The 4-quinazolone-sodium thus obtained is suspended in 120 ml. of anhydrous dimethyl-formamide and 28.1 g. of benzoyl-chloride are added dropwise. The reaction mixture is stirred for 4 hours, whereupon the mixture is filtered and the filtrate evaporated. The residue is extracted with hot anhydrous xylene. The xylene solution is cooled, filtered and the filtrate is evaporated to dryness in vacuo. The residue is recrystallised from benzene. Thus 3-benzoyl-4-quinazolone is obtained, M.P. 135–136° C. The mixture of the product and the compound prepared according to Example 5(a) does not show a melting-point depression.

(c) 24 ml. of anhydrous pyridine are poured into a mixture of 2.92 g. of 4-quinazolone and 3.4 g. of benzoyl-chloride. The mixture is allowed to stand for 2 hours, whereupon it is filtered, washed with anhydrous benzene and the filtrate is evaporated to dryness in vacuo. The residue is extracted with hot benzene. The benzene extracts are cooled, the precipitated crystals are separated by filtration and the filtrate is evaporated again. From the residue 3-benzoyl-4-quinazolone is obtained. M.P.: 135–136° C.

(d) 80 ml. of anhydrous triethylamine are added to a mixture of 17.6 g. of 4-quinazolone and 14.5 g. of benzoyl chloride.

The reaction mixture is shaken for half an hour, whereupon it is allowed to stand at 0–5° C. and 24 hours. The solid is filtered, washed with anhydrous petrol and dried. The dry product is worked up as shown in Example 5(c). Thus 3-benzoyl-4-quinazolone is obtained. M.P.: 135–136° C.

(e) 2.68 g. of benzoic acid are dissolved in 10 ml. of a mixture of anhydrous chloroform and 2.22 g. of triethylamine, whereupon 2.38 g. of ethyl-chloroformiate are added dropwise under stirring and cooling. The reaction mixture is stirred at room temperature for 15 minutes, whereupon a suspension of 2.92 g. of 4-quinazolone and 50 ml. of chloroform are added. After stirring for 5 hours the reaction mixture is filtered and the filtrate is evaporated in vacuo. The residue is extracted with hot benzene, filtered and the filtrate is evaporated in vacuo. The residue is distilled off under reduced pressure and the fraction running through at 200–215° C. 6 mm. Hg is collected. After recrystallization from benzene a product melting at 135–136° C. is obtained which does not show a melting point depression with the 3-benzoyl-4-quinazolone prepared according to Example 5(a).

EXAMPLE 6

Preparation of 3-(p-nitro-benzoyl)-4-quinazolone 2. 92 g. of 4-quinazolone are suspended in 50 ml. of anhydrous chloroform, whereupon subsequently 2.22 g. of anhydrous triethylamine and a solution of 4.1 g. of p-nitro-benzoyl-chloride and 30 ml. of anhydrous chloroform are added under stirring. The reaction mixture is stirred for half an hour, whereupon it is allowed to stand for 12 hours. The precipitated product is filtered, washed withchloroform and dried. After recrystallization from anhydrous dimethylformamide crystals melting at 235–237° C. are obtained.

*Analysis.*—Calcd. for $C_{15}H_9N_3O_4$ (percent): C, 61.1; H, 3.03; N, 14.25. Found (percent): C, 61.2; H, 3.2; N, 14.5.

EXAMPLE 7

Preparation of 3-(p-chloro-benzoyl)-4-quinazolone 17.6 g. of 4-quinazolone are suspended in 120 ml. of anhydrous dioxane, whereupon 10.1 g. of triethylamine and 17.5 of p-chloro-benzoyl-chloride are added. The reaction mixture is stirred at room temperature for 5 hours, whereupon the insoluble substance is filtered off and the filtrate is evaporated to dryness in vacuo. The residue is recrystallized twice from anhydrous benzene. Thus 3 - (p-chloro-benzoyl)-4-quinazolone is obtained, M.P.: 160–162° C.

*Analysis.*—Calcd. for $C_{15}H_9N_2ClO_2$ (percent):C, 63.4; H, 3.16; N, 9.94; Cl, 12.45. Found (percent): C, 63.5; H, 3.28; N, 10.05; Cl, 12.57.

EXAMPLE 8

Preparation of 3-carbethoxy-7-nitro-4-quinazolone 3.82 g. of 7-nitro-4-quinazolone are reacted with 2.17 g. of ethyl-chloroformiate in 24 ml. of anhydrous pyridine according to the method described in Example 5(e).

After recrystallizing the product obtained 3-carbethoxy-7-nitro-4-quinazolone melting at 152–154° C. is obtained.

*Analysis.*—Calcd. for $C_{11}H_9N_3O_5$ (percent): C, 50.2; H, 3.42; N, 16.0. Found (percent): C, 50.27; H, 3.61; N, 16.22.

EXAMPLE 9

(a) The 3 - benzoyl-7-nitro-4-quinazolone is obtained according to the method described in Example 5(a). M.P.: 217–219° C.

*Analysis.*—Calcd. for $C_{15}H_9N_3O_4$ (percent): C, 61.0; H, 3.05; N, 14.25. Found (percent): C, 61.14; H, 3.08; N, 14.4.

(b) 3.82 g. of 7-nitro-4-quinazolone and 3.4 g. of benzoyl-chloride are reacted in 24 ml. of anhydrous pyridine according to the method described in Example 5(c). The precipitated substance is filtered, washed with benzene and dried. The product is extracted with hot benzene. On adding petrol to the extract a crystalline material precipitates which is filtered, washed with a mixture of benzene and petrol and dried. On recrystallization from benzene 3-benzoyl-7-nitro-4-quinazolone is obtained. Said product is identical with the compound prepared by Example 9(a), according to the physical and chemical properties thereof. M.P.: 217–219° C.

EXAMPLE 10

Preparation of 3-(p-chloro-benzoyl)-7-nitro-4-quinazolone (a) 3.82 g. of 7-nitro-4-quinazolone are reacted with 2.8 g. of p-chloro-benzoyl-chloride in 24 ml. of anhydrous pyridine according to the method described in Example 5(c). The precipitated product is separated by filtration, extracted with hot xylene and the crystalline product obtained from the xylene extract is recrystallized from benzene. Thus 3-(p-chloro-benzoyl)-7-nitro-4-quinazolone is obtained. M.P.: 240–242° C.

*Analysis.*—Calcd. for $C_{15}H_8N_3ClO_4$ (percent): S, 54.8; H, 2.42; N, 12.75. Found (percent) C, 55.0; H, 2.57; N, 12.79.

(b) 3.9 g of 4-quinazolone and 26 g. of p-chloro-benzoyl-chloride are reacted in 20 ml. of anhydrous triethylamine as described in Example 5(d). The reaction mixture is worked up according to the method disclosed in Example 10(a). The product thus obtained melts at 238° C. and does not show a melting point depression with the 3 - (p-chloro-benzoyl)-7-nitro-4-quinazolone prepared according to Example 10(a).

EXAMPLE 11

10 g. of 3-hydroxy-4-quinazolone are refluxed with 50 ml. of acetic anhydride. The reaction mixture is evaporated in vacuo and the residue is recrystallized from benzene. Thus 3-acetoxy-4-quinazolone is obtained. M.P.: 112–113° C.

*Analysis.*—Calcd. for $C_{19}H_8N_2O_3$ (percent): C, 58.8; H, 3.92; N, 13.7. Found (percent): C, 59.0; H, 4.16; N, 13.86.

EXAMPLE 12

Preparation of 3-benzoxy-4-quinazolone 1.61 g. of sodium are dissolved in 100 ml. of anhydrous methanol whereupon 11.32 g. of 3-hydroxy-4-quinazolone are added to the sodium-methylate solution thus obtained. The reaction mixture is boiled for an hour under stirring, whereupon it is made free of alcohol with the aid of benzene.

The 3-hydroxy-4-quinazolone-sodium thus contained is suspended in 150 ml. of anhydrous dioxane whereupon 9.85 g. of benzoyl chloride are added dropwise under stirring. The reaction mixture is stirred for 7 hours, whereafter the insoluble material is separated by filtration and evaporated in vacuo. On recrystallizing the residue from benzene 3 - benzoxy - 4-quinazolone is obtained. M.P.: 156° C.

*Analysis.*—Calcd. for $C_{15}H_{10}N_2O_3$ (percent): C, 67.8; H, 3.76; N, 10.52. Found (percent): C, 67.8; H, 3.79; N, 10.79.

EXAMPLE 13

Preparation of 2-methyl-3-acetoxy-4-quinazolone (a) This compound is prepared according to the method described in Example 11. M.P.: 118–120° C.

*Analysis.*—Calcd. for $C_{11}H_{10}N_2O_3$ (percent): C, 60.5; H, 4.58; N, 12.85. Found (percent): C, 60.32; H, 4.80; N, 12.7.

(b) 7.05 g. of 2-methyl-3-hydroxy-4-quinazolone are dissolved in 140 ml. of anhydrous dimethylformamide whereupon a solution of 2.4 g. of acetic acid and 8.24 g. of dicyclohexyl-carbodiimide is added under stirring. The reaction mixture is allowed to stand for 16 hours, whereupon the precipitated dicyclohexylurea is filtered off. The filtrate is evaporated in vacuo and the residue is recrystallized from benzene. Thus crystals melting at 118–120° C. are obtained. A mixture of the product and the compound prepared according to Example 13(a) did not show a melting-point depression.

EXAMPLE 14

Preparation of 2-methyl-3-butyryloxy-4-quinazolone 8.8 g. of butyric acid and 10.1 g. of anhydrous triethylamine are dissolved in 100 ml. of anhydrous dioxane. A mixture of 10.85 g. of ethyl-chloroformiate and 15 ml. of anhydrous dioxane are added dropwise under stirring at 10° C., whereupon the mixture is stirred for 15 minutes and 17.6 g. of 2-methyl-3-hydroxy-4-quinazolone are added. The reaction mixture is stirred at room-temperature for 2 hours, whereupon the insoluble material is removed by filtration. The filtrate is evaporated to dryness in vacuo and the residue is recrystallized from benzene. Thus 2-methyl-3-butyryloxy-4-quinazolone is obtained. M.P.: 78–80° C.

*Analysis.*—Calcd. for $C_{13}H_{14}N_2O_3$ (percent): C, 63.4; H, 5.68; N, 11.37. Found (percent): C, 63.3; H, 5.7; N, 11.48.

EXAMPLE 15

Preparation of 2-methyl-3-(carbethoxy-oxy)-4-quinazolone 7 g. of 2-methyl-3-hydroxy-4-quinazolone are converted into the sodium salt according to the method described in Example 12 and the sodium salt is reacted with 4.33 g. of ethyl-chloroformiate in dioxane as shown in Example 12. The reaction-mixture is worked up according to the method disclosed in said example. Thus 2-methyl-3-(carbethoxy-oxy)-4-quinazolone is obtained. M.P.: 84–86° C.

*Analysis.*—Calcd. for $C_{12}H_{12}N_2O_4$ (percent): C, 58.2; H, 4.83; N, 11.3. Found (percent): C, 58.41; H, 4.87; N, 11.27.

EXAMPLE 16

Preparation of 2-methyl-3-(N-carbobenzyloxy-glycyl-oxy)-4-quinazolone 2.09 g. of carbobenzyloxy-gylcine and 2 g. of 2-methyl-3-hydroxy-4-quinazolone are suspended in 25 ml. of anhydrous dimethylformamide, whereupon a solution of 2.06 g. of dicyclohexylcarbodiimide and 25 ml. of ethyl acetate are poured in at 5° C. The reaction mixture is stirred at this temperature for 2 hours whereupon it is allowed to stand at about 0° C. for 16 hours. The insoluble substance is removed by filtration and the filtrate is evaporated in vacuo. The residue is admixed with 120 ml. of benzene and the mixture thus obtained is washed at 0° C. three times with 40 ml. of a 8% sodium hydroxide solution each. The benzene solution is washed with ice-water until neutral, dried over magnesium sulfate and evaporated in vacuo. The residue is admixed with 120 ml. of benzene and the mixture thus obtained is washed at 0° C. three times with 40 ml. of a 8% sodium hydroxide solution each. The benzene solution is washed with ice-water until neutral, dried over magnesium sulfate and evaporated. The residue is recrystallized from benzene. Thus 2-methyl-3-(N-carbobenzyloxy-glycyl-oxy)-4-quinazolone is obtained. M.P.: 128–130° C.

*Analysis.*—Calcd. for $C_{19}H_{17}N_3O_5$ (percent): C, 62.0; H, 4.63; N, 11.45. Found (percent): C, 62.38; H, 4.49; N, 11.69.

EXAMPLE 17

Preparation of 2-methyl-3-benzoyl-oxy-4-quinazolone (a) This compound is prepared from 7 g. of 2-methyl-5-hydroxy-4-quinazolone and 5.62 g. of benzoyl-chloride according to the method described in Example 12. M.P.: 156–158° C.

*Analysis.*—Calcd. for $C_{16}H_{12}N_2O_3$ (percent): C, 68.5; H, 4.28; N, 10.0. Found (percent): C, 68.42; H, 4.1; N, 10.9.

(b) The 2-methyl-3-benzoyloxy-4-quinazolone may also be prepared according to the method described in Example 14. After recrystallization from benzene the product melts at 156–158° C. and does not show a melting point depression with the compound prepared according to Example 17(a).

EXAMPLE 18

Preparation of 2-methyl-3-(p-chloro-benzoyloxy)-4-quinazolone (a) This compound is prepared according to the method described in Example 12. After recrystallization from benzene the product melts at 180–182° C.

*Analysis.*—Calcd. for $C_{16}H_{11}ClN_2O_3$ (percent): C, 61.2; H, 3.5; N, 11.35. Found (percent): C, 61.25; H, 3.61; N, 11.15.

(b) 17.6 g. of 2-methyl-3-hydroxy-4-quinazolone are suspended in 150 ml. of anhydrous dioxane whereupon first 10.1 g. of triethylamine and then 17.5 g. of p-chlorobenzoyl-chloride are added under stirring and cooling. The reaction mixture is stirred for 8 hours whereupn it is filtered and the filtrate is evaporated in vacuo. The residue is stirred at 0° C. with a 8% sodium hydroxide solution, filtered, washed with ice-cold water until neutral and dried in vacuo. Thus 2-methyl-3-(p-chlorobenzoyloxy)-4-quinazolone is obtained; M.P. 180–182° C. A mixture of the product and the compound prepared according to Example 18(a) does not show a melting-point depression.

(c) 3.5 g. of 2-methyl-3-hydroxy-4-quinazolone are suspended in 40 ml. of anhydrous dioxane, whereupon 1.75 g. of p-chlorobenzoyl-chloride are added in 10 ml. of anhydrous dioxane. The reaction mixture is stirred at room-temperature for 5 hours whereupon it is evaporated to dryness in vacuo. The crystalline residue is admixed at 0° C. with a 8% sodium hydroxide solution, filtered, the solid substance is washed on the filter with ice-cold water until neutral and dried in vacuo. Thus 2-methyl-3-p-(chloro-benzoyl-oxy)-4-quinazolone is obtained by almost quantitative yields. M.P.: 180–182° C. The product does not show a melting point depression with the substance prepared according to Example 18(a).

EXAMPLE 19

Preparation of 2-methyl-3-(3,5-dinitro-benzoyl-oxy)-4-quinazolone (a) 7 g. of 2-methyl-3-hydroxy-4-quinazolone are converted into the sodium salt and reacted with 10.5 g. of 3,5-dinitro-benzoyl-chloride in dioxane according to the method described in Example 12. The reaction mixture is worked up as shown in said example. Thus 2-methyl-3-(3,5-dinitro-benzoyl-oxy)-4-quinazolone is obtained. M.P.: 192–194° C.

*Analysis.*—Calcd. for $C_{16}H_{10}N_4O_7$ (percent): C, 52.0; H, 2.7; N, 15.1. Found (percent): C, 51.9; H, 3.02; N, 14.95.

(b) 2-methyl-3-hydroxy-4-quinazolone is dissolved in 70 ml. of anhydrous pyridine, whereupon at 30° C. a solution of 14.6 g. of 3,5-dinitro-benzoyl-chloride and 35 ml. of benzene is added. The reaction mixture is stirred for an hour and allowed to stand for 16 hours. After addition of 200 ml. of benzene the mixture is extracted first with water and then with a 10% hydrochloric acid solution in order to remove the pyridine. The precipitated product is filtered, washed subsequently with benzene and an 8% sodium hydroxide solution at 0° C. and finally with icy water until neutral. The product is dried in vacuo. Thus 2-methyl-3-(3,5-dinitro-benzoyl-oxy)-4-quinazolone is obtained. M.P.: 190–192° C. A mixture of the product and the compound prepared according to Example 19(a) does not show a melting-point depression.

EXAMPLE 20

The 2-methyl-3-(p-toluene-oxy)-4-quinazolone is prepared according to the method described in Example 12. After recrystallization from benzene the melting point of the product amounts to 172° C.

*Analysis.*—Calcd. for $C_{17}H_{14}N_2O_3$ (percent): C, 69.4; H, 4.75; N, 9.53. Found (percent): C, 69.4; H, 4.95; N, 9.70.

EXAMPLE 21

Preparation of 2-methyl-3-(p-nitro-benzoyl-oxy)-4-quinazolone 14.6 g. of 2-methyl-3-hydroxy-4-quinazolone are suspended in 80 ml. of anhydrous dioxane whereupon a mixture of 9.26 g. of p-nitro-benzoyl-chloride and 40 ml. of anhydrous dioxane is added under stirring. The mixture is stirred for 3 hours whereupon it is allowed to stand for 12 hours. The dioxane is evaporated in vacuo and the residue is worked up as described in Example 18(b). Thus 2-methyl-3-(p-nitro-benzoyloxy)-4-quinazolone is obtained by almost quantitative yields. M.P.: 218–220° C.

*Analysis.*—Calcd. for $C_{16}H_{11}N_3O_5$ (percent): C, 59.0; H, 3.39; N, 12.93. Found (percent): C, 59.08; H, 3.52; N, 12.88.

EXAMPLE 22

Preparation of 2-methyl-3-(3-phenyl-5-methyl-4-isoxazolyl-carbonyloxy)-4-quinazolone 20.5 g. of 3-phenyl-5-methyl-isoxazole-4-carboxylic acid and 15 ml. of thionyl chloride are heated at 70° C. for 0.5 hour. The excess of thionyl chloride is distilled off in vacuo and the traces of thionyl chloride are removed by distilling off twice 20 ml. of benzene each. The crystalline 3-phenyl-5-methyl-isoxazole-4-carboxylic acid chloride thus obtained is dissolved in 120 ml. of dioxane and reacted with the sodium salt prepared from 17.6 g. of 2-methyl-3-hydroxy-4-quinazolone as described in Example 12. The reaction mixture is worked up according to said example, whereupon the crude product is dissolved in benzene, extracted with an 8% sodium hydroxide solution at 0° C. and washed with icy water until neutral. The benzene solution is dried over magnesium sulfate and evaporated. The residue is recrystallized twice from benzene. Thus 2 - methyl-3-(3-phenyl-5-methyl-4-isoxazolyl-carbonyloxy) - 4 - quinazolone is obtained. M.P.: 140–142° C.

Analysis.—Calcd. for $C_{16}H_{11}N_3O_5$ (percent): C, 66.5; H, 4.15; N, 11.62. Found (percent): C, 66.61; H, 4.0; N, 11.74.

EXAMPLE 23

Preparation of 2-phenyl-3-acetoxy-4-quinazolone

This compound is prepared from 5 g. of 2-phenyl-3-hydroxy-4-quinazolone and 50 ml. of acetic anhydride according to the method described in Example 11. M.P.: 114–116° C.

Analysis.—Calcd. for $C_{16}H_{12}N_2O_3$ (percent): C, 68.5; H, 4.28; N, 10.0. Found (percent): C, 68.45; H, 4.24; N, 10.2.

EXAMPLE 24

Preparation of 2-phenyl-3-benzoyloxy-4-quinazolone

This compound is prepared from 9.52 g. of 2-phenyl-3-hydroxy-4-quinazolone and 5.62 g. of benzoyl chloride according to the method described in Example 12. M.P.: 152–154° C.

Analysis.—Calcd. for $C_{21}H_{14}N_2O_3$ (percent): C, 73.7; H, 4.1; N, 8.19. Found (percent): C, 73.98; H, 4.22; N, 8.11.

EXAMPLE 25

Preparation of 2-methyl-3-benzoyloxy-4-quinazolone 3.57 g. of 2-methyl-3-hydroxy-4-quinazolone are dissolved in 60 ml. of anhydrous tetrahydrofurane in the presence of 2.88 ml. of anhydrous triethylamine, whereupon at −5° C. anhydrous tetrahydrofurane containing 20–30% of phosgene is added dropwise until the alkaline reaction mixture becomes netural. After stirring for 45 minutes 1.22 g. of benzoic acid are added. The mixture is stirred at room temperature for 16 hours, whereupon it is evaporated to dryness in vacuo. The residue is slurried in an 8% sodium hydroxide solution at 0° C., whereupon it is filtered and washed subsequently with a sodium hydroxide solution and water. After recrystallization from benzene 2-methyl-3-benzoyloxy-4-quinazolone is obtained. If 4-quinazolone is used the urea derivative is obtained as intermediate.

What we claim is:

1. A 4-quinazolone derivative having the general formula

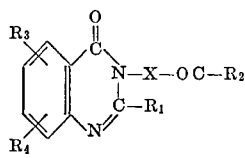

wherein:

$R^1$ is selected from the group consisting of hydrogen, phenyl and alkyl radicals with 1 to 6 carbon atoms;

$R^2$ is a member of the group consisting of alkyl radicals with 1 to 6 carbon atoms, alkoxy radicals containing 1 to 6 carbon atoms, phenyl, substituted phenyl wherein the substituent is at least one nitro, halogen or alkyl group, carbobenzyl-oxy-glycyl, and nitrogen-containing radicals;

$R^3$ is selected from the group consisting of hydrogen, halogen and nitro groups;

X is a member of the group consisting of a valency-bond and oxygen;

said derivative being selected from the group which consists of 3-acetyl-7-nitro-4-quinazolone, 3-acetyl-6-chloro-4-quinazolone, 3-acetyl-4-quinazolone, 3-acetyl-6,8-dichloro-4-quinazolone, 3-benzoyl-4-quinazolone, 3-(p-nitro-benzoyl)-4-quinazolone, 3-(p-chloro-benzoyl)-4-quinazolone, 3-carbethoxy-4-quinazolone, 3-benzoyl-7-nitro-4-quinazolone, 3 - (p-chloro-benzoyl) - 7-nitro-4-quinazolone, 3-acetoxy-4-quinazolone, 3-benzoxy-4-quinazolone, 2-methyl-3-acetoxy-4-quinazolone, 2-methyl-3-butyryloxy-4-quinazolone, 2-methyl-3-carbethoxy-oxy-4-quinazolone, 2-methyl-3-(N-carbobenzyloxy-glycyl-oxy) - 4-quinazolone, 2-methyl-3-benzoyloxy-4-quinazolone, 2 - methyl-3-(p-chloro-benzoyl-oxy)-4-quinazolone, 2-methyl-3-(3,5-dinitro-benzoyl-oxy)-4-quinazolone, 2 - methyl-3-(p-tolyloxy)-4-quinazolone, 2-methyl-3 - (p-nitro-benzoyloxy)-4-quinazolone, 2-methyl-3-(3-phenyl-5-methyl - 4 - isoxazolyl-carbonyloxy) - 4-quinazolone, 2-methyl-3-acetoxy-4-quinazolone, and 2-phenyl-3-benzoyl-oxy-4-quinazolone.

2. The 4-quinazolone derivative defined in claim 1 and consisting of 3-acetyl-7-nitro-4-quinazolone.

3. The 4-quinazolone derivative defined in claim 1 and consisting of 3-acetyl-6-chloro-4-quinazolone.

4. The 4-quinazolone derivative defined in claim 1 and consisting of 3-acetyl-4-quinazolone.

5. The 4-quinazolone derivative defined in claim 1 and consisting of 3-acetyl-6,8-dichloro-4-quinazolone.

6. The 4-quinazolone derivative defined in claim 1 and consisting of 3-benzoyl-4-quinazolone.

7. The 4-quinazolone derivative defined in claim 1 and consisting of 3-(p-nitro-benzoyl)-4-quinazolone.

8. The 4-quinazolone derivative defined in claim 1 and consisting of 3-(p-chloro-benzoyl)-4-quinazolone.

9. The 4-quinazolone derivative defined in claim 1 and consisting of 3-carbethoxy-4-quinazolone.

10. The 4-quinazolone derivative defined in claim 1 and consisting of 3-benzoyl-7-nitro-4-quinazolone.

11. The 4-quinazolone derivative defined in claim 1 and consisting of 3-(p-chloro-benzoyl)-7-nitro-4-quinazolone.

12. The 4-quinazolone derivative defined in claim 1 and consisting of 3-acetoxy-4-quinazolone.

13. The 4-quinazolone derivative defined in claim 1 and consisting of 3-benzoxy-4-quinazolone.

14. The 4-quinazolone derivative defined in claim 1 and consisting of 2-methyl-3-acetoxy-4-quinazolone.

15. The 4-quinazolone derivative defined in claim 1 and consisting of 2-methyl-3-butyryloxy-4-quinazolone.

16. The 4-quinazolone derivative defined in claim 1 and consisting of 2-methyl-3-carbethoxy-oxy-4-quinazolone.

17. The 4-quinazolone derivative defined in claim 1 and consisting of 2-methyl-3-(N-carbobenzyloxy-glycyl-oxy)-4-quinazolone.

18. The 4-quinazolone derivative defined in claim 1 and consisting of 2-methyl-3-benzoyloxy-4-quinazolone.

19. The 4-quinazolone derivative defined in claim 1 and consisting of 2-methyl-3 - (p-chloro-benzoyl-oxy)-4-quinazolone.

20. The 4-quinazolone derivative defined in claim 1 and consisting of 2-methyl-3-(3,5-dinitro-benzoyl-oxy)-4-quinazolone.

21. The 4-quinazolone derivative defined in claim 1 and consisting of 2-methyl-3-(p-tolyloxy)-4-quinazolone.

22. The 4-quinazolone derivative defined in claim 1 and consisting of 2-methyl-3-(p-nitro-benzoyloxy)-4-quinazolone.

23. The 4-quinazolone derivative defined in claim 1 and consisting of 2-methyl-3-(3-phenyl-5-methyl-4-isoxazolylcarbonyloxy)4-quinazolone.

24. The 4-quinazolone derivative defined in claim 1 and consisting of 2-methyl-3-acetoxy-4-quinazolone.

25. The 4-quinazolone derivative defined in claim 1 and consisting of 2-phenyl-3-benzoyl-oxy-4-quinazolone.

References Cited

C. A. 30, 4835[7] (1936) Shah et al.
C. A. 64, 734a (1966) Patel et al.

ALEX MAZEL, Primary Examiner
R. V. RUSH, Assistant Examiner

U.S. Cl. XR.
260—691; 424—251